United States Patent
Chen et al.

(10) Patent No.: US 10,438,344 B2
(45) Date of Patent: Oct. 8, 2019

(54) SYSTEM FOR DETERMINING AMOUNT OF GLUE APPLICATION

(71) Applicant: POU CHEN CORPORATION, Chang Hwa Hsien (TW)

(72) Inventors: Ying-Chih Chen, Taichung (TW); Wei-Hsin Hsu, Chang Hwa Hsien (TW); Han-Cheng Chen, Taichung (TW)

(73) Assignee: Pou Chen Corporation, Chang Hwa Hsien (TW)

( * ) Notice: Subject to any disclaimer, the term of this patent is extended or adjusted under 35 U.S.C. 154(b) by 0 days.

(21) Appl. No.: 16/053,301

(22) Filed: Aug. 2, 2018

(65) Prior Publication Data
US 2019/0050976 A1    Feb. 14, 2019

(30) Foreign Application Priority Data

Aug. 8, 2017 (TW) ............... 106126714 A

(51) Int. Cl.
*H04N 7/18* (2006.01)
*G06T 7/00* (2017.01)
(Continued)

(52) U.S. Cl.
CPC ............... *G06T 7/001* (2013.01); *G06T 7/90* (2017.01); *H04N 7/18* (2013.01); *G06T 2207/10004* (2013.01); *H04N 5/2256* (2013.01)

(58) Field of Classification Search
CPC ........ H04N 7/18; H04N 5/2256; G06T 7/001; G06T 7/90; G06T 2207/10004
(Continued)

(56) References Cited

U.S. PATENT DOCUMENTS 2,098,313 A * 11/1937 Sottile ...................... A43D 5/02
                                                                   12/123
4,098,632 A * 7/1978 Sprague, Jr. ......... A43D 25/183
                                                                   12/142 F
(Continued)

FOREIGN PATENT DOCUMENTS

CN          106770343 A      5/2017
TW          M503948 U      7/2015

OTHER PUBLICATIONS

Search Report appended to an Office Action, which was issued to Taiwanese counterpart application No. 106126714 by the TIPO dated Jun. 11, 2018 (2 pages, English translation included).

*Primary Examiner* — Trang U Tran
(74) *Attorney, Agent, or Firm* — Michael Best & Friedrich LLP

(57) ABSTRACT

A system for determining an amount of glue applied to a shoe portion includes a lighting device, an image capturing device and a processor. The lighting device illuminates the shoe portion with light beams that have wavelengths within a predetermined range. The image capturing device captures an image associated with the shoe portion under illumination of the light beams, and outputs the image associated with the shoe portion. The processor obtains chromaticity values of pixels selected from an instance of the image associated with the shoe portion that is applied with glue, and generates a result of estimation regarding the amount of the glue applied to the shoe portion based on the chromaticity values and at least one reference value.

7 Claims, 6 Drawing Sheets

(51) Int. Cl.
*G06T 7/90* (2017.01)
*H04N 5/225* (2006.01)
(58) Field of Classification Search
USPC .......................................................... 348/92
See application file for complete search history.

(56) References Cited

U.S. PATENT DOCUMENTS

| | | | | |
|---|---|---|---|---|
| 2006/0188668 A1* | 8/2006 | Wahba | ...................... | B44C 5/00 |
| | | | | 428/13 |
| 2010/0210165 A1* | 8/2010 | Stralin | .................... | C08L 97/02 |
| | | | | 442/381 |
| 2011/0008631 A1* | 1/2011 | Lindqvist | .................. | B32B 7/14 |
| | | | | 428/449 |
| 2017/0231329 A1* | 8/2017 | Mercalli | ................ | A43D 25/18 |
| | | | | 12/73.5 |

* cited by examiner

SYSTEM FOR DETERMINING AMOUNT OF GLUE APPLICATION

CROSS-REFERENCE TO RELATED APPLICATION

This application claims priority of Taiwanese Invention Patent Application No. 106126714, filed on Aug. 8, 2017.

FIELD

The disclosure relates to a system for determining an amount of glue applied to a shoe portion.

BACKGROUND

In the manufacturing process of a shoe, a shoe portion to be attached to other portion(s) of the shoe is applied with glue. Taiwanese Utility Model Patent No. M503948 discloses a conventional approach of inspecting the applied glue which includes step of determining a spreading area of the glue applied on the shoe portion by means of detecting light beams passing through the glue. However, the conventional approach cannot be utilized to determine variation in the amount of glue over an area of the shoe portion.

SUMMARY

Therefore, an object of the disclosure is to provide a system for determining an amount of glue applied to a shoe portion that can alleviate at least one of the drawbacks of the prior art.

According to the disclosure, the system includes a lighting device, an image capturing device and a processor. The lighting device is configured to illuminate the shoe portion with light beams that have wavelengths within a predetermined range. The image capturing device is configured to capture an image associated with the shoe portion under illumination of the light beams, and to output the image associated with the shoe portion. The processor is configured to obtain chromaticity values $M_1$ to $M_m$ of m number of pixels selected from an instance of the image associated with the shoe portion that is applied with glue, and to generate a result of estimation regarding the amount of the glue applied to the shoe portion based on the chromaticity values $M_1$ to $M_m$, where m is an integer not less than one.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
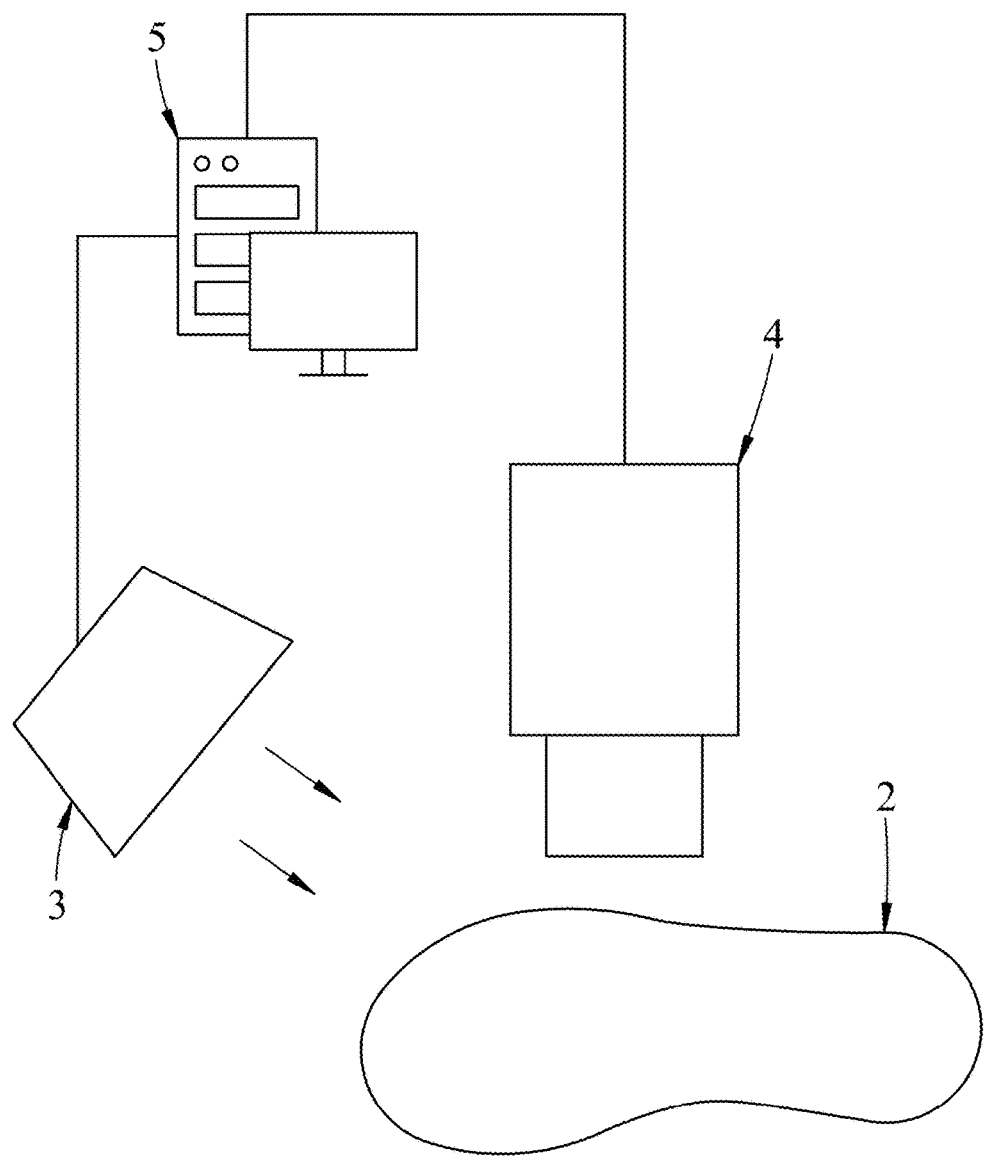
FIG. 1 is a schematic diagram illustrating an embodiment of a system for determining an amount of glue applied to a shoe portion according to the disclosure.

Referring to FIG. 1, an embodiment of a system for determining an amount of glue applied to a shoe portion 2 is illustrated. In this embodiment, the shoe portion 2 is exemplified as a shoe sole, but the shoe portion 2 can be any part of a shoe that requires glue application during the manufacturing process.

The shoe portion 2 is to be applied with glue. In this embodiment, the glue is implemented to be colored glue. The colored glue is used for better detection and determination by the system of the disclosure.

The system includes a lighting device 3, an image capturing device 4 and a processor 5.

The lighting device 3 is configured to illuminate the shoe portion 2 with light beams that have wavelengths within a predetermined range. In this embodiment, the lighting device 3 is configured to illuminate the shoe portion 2 with light beams that have wavelengths ranging between 10 nanometers and 400 nanometers. That is to say, the light beams are implemented to be Ultraviolet light (UV light). The colored glue contains a fluorescent substance which emits colored glow when exposed to the UV light so the glue can be observed with ease under illumination of the UV light.

The image capturing device 4 is configured to capture an image associated with the shoe portion 2 under illumination of the light beams, and to output the image associated with the shoe portion 2. For each of pixels of the image associated with the shoe portion 2, a chromaticity value of the pixel is encoded using eight or more bits. Under illumination of the UV light, variation in the chromaticity values of the pixels of the image associated with the shoe portion 2 can be emphasized. In this embodiment, the image capturing device 4 is implemented to be a charge-coupled device (CCD).

The processor 5 is electrically connected with the image capturing device 4 and the lighting device 3.

The processor 5 is configured to obtain the image outputted by the image capturing device 4. The image may be utilized in the determination of the amount of the glue applied to the shoe portion 2. Inspection of the condition of application of the glue on the shoe portion 2 is implemented by means of automation, an example of which is disclosed as follows.

Figure 5:
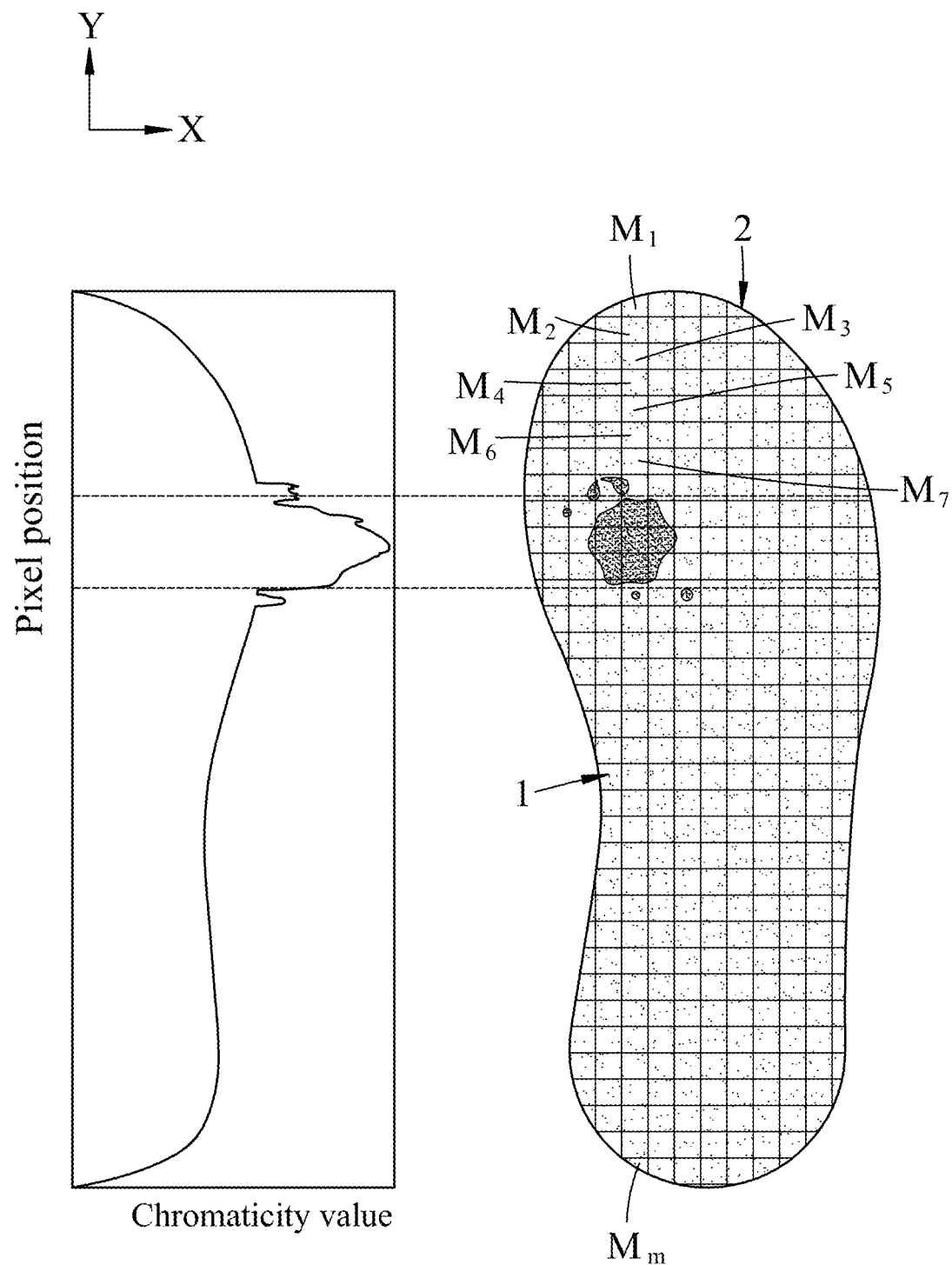
FIG. 5 is a schematic diagram illustrating an embodiment of chromaticity values of pixels selected from still another instance of the image associated with the shoe sole that is applied with an excessive amount of the glue.
Figure 6:
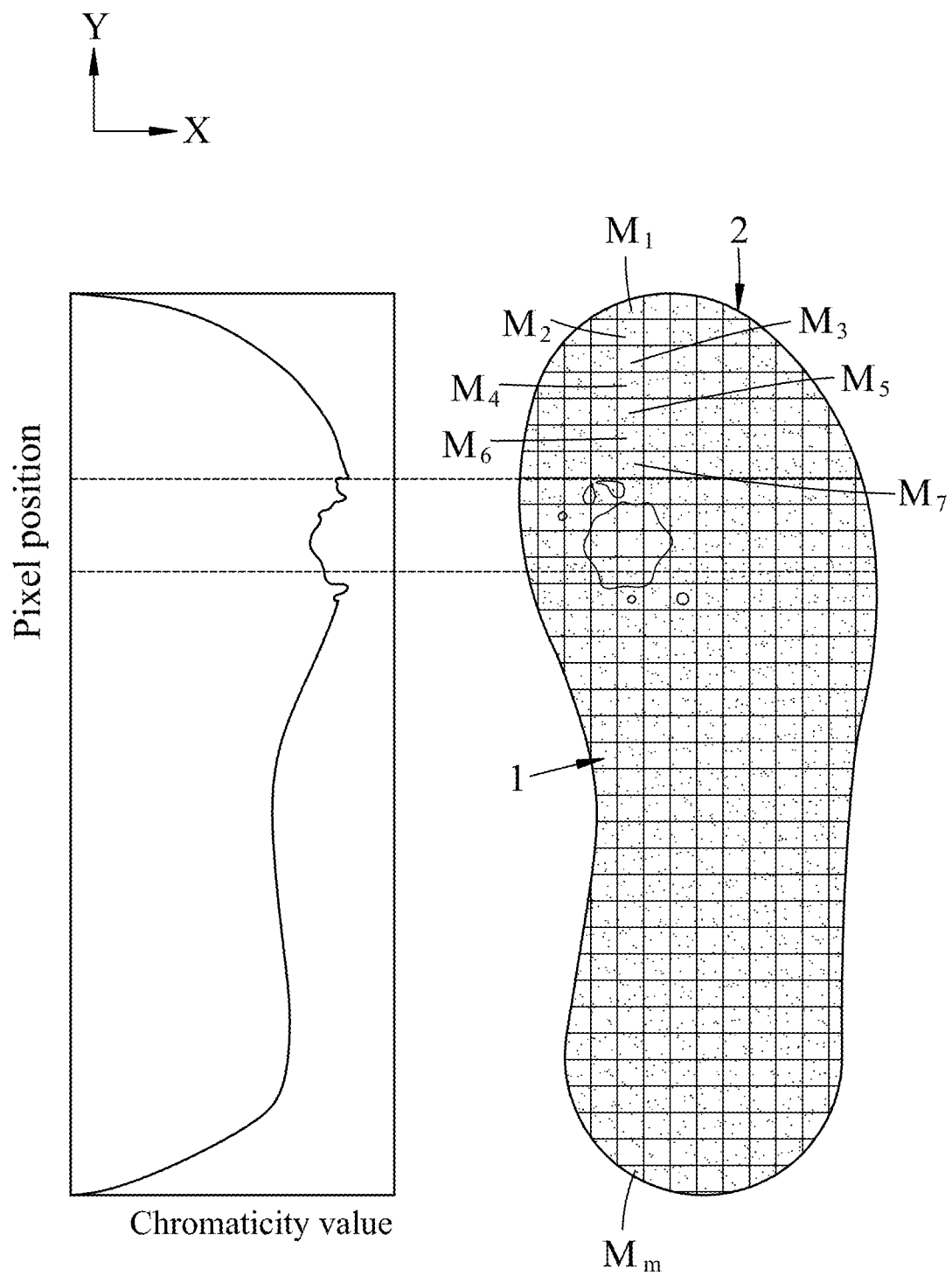
FIG. 6 is a schematic diagram illustrating an embodiment of chromaticity values of pixels selected from further another instance of the image associated with the shoe sole that is applied with a deficient amount of the glue.

The processor 5 is further configured to obtain chromaticity values $M_1$ to $M_m$ of m number of pixels along a predetermined direction of an instance of the image associated with the shoe portion 2 that is fully applied with the glue as exemplified in one of FIGS. 5 and 6, and to generate a result of estimation regarding an amount of the glue applied to the shoe portion 2 based on the chromaticity values $M_1$ to $M_m$, where m is an integer not less than one. It is worth noting that in this embodiment, the chromaticity values $M_1$ to $M_m$ are values from a single channel of color (e.g., blue channel) of the pixels on the image.

Figure 3:
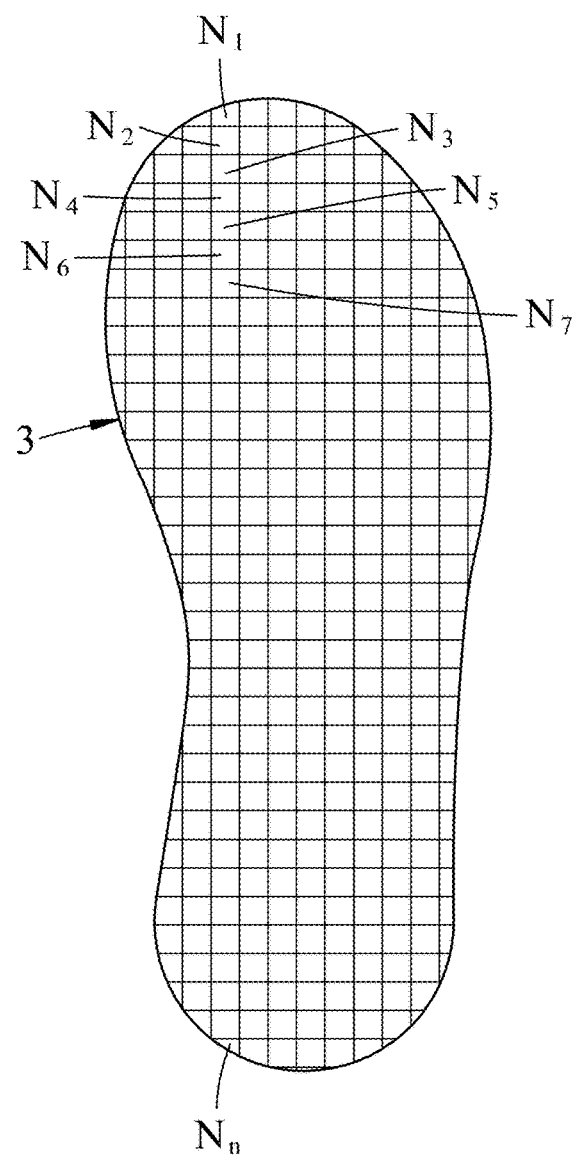
FIG. 3 is a schematic diagram illustrating an embodiment of an image which is an instance of the image associated with the shoe portion that is not applied with the glue.

The processor 5 is configured to obtain chromaticity values $N_1$ to $N_m$ of m number of pixels selected from a reference image which is another instance of the image associated with the shoe portion 2 that is not applied with the glue as shown in FIG. 3. The m number of pixels which are selected from the reference image respectively correspond to the pixels which are selected from the instance of the image associated with the shoe portion 2 that is applied with the glue. The processor 5 is configured to calculate m number of deviation values $R_i=M_i-N_i$ where i is an integer ranging from 1 to m. In one embodiment, for one of the m number of deviation values $R_i$, the processor 5 is configured to generate the result of estimation which indicates that the amount of the glue is normal when it is determined by the processor 5 that a condition that the deviation value falls in a range from $V_0-A$ to $V_0+A$ is satisfied, and to generate the result of estimation which indicates that the amount of the glue is abnormal when it is determined by the processor 5 that the condition is not satisfied, where $V_0$ represents a predetermined base value, and A represents a predetermined tolerance value. In addition, in one embodiment, for one of the m number of deviation values $R_i$, the processor 5 is configured to generate the result of estimation which indicates that the amount of the glue is deficient when it is determined by the processor 5 that the deviation value is smaller than $V_0-A$, and to generate the result of estimation which indicates that the amount of the glue is excessive when it is determined by the processor 5 that the deviation value is greater than $V_0+A$.

Figure 4:
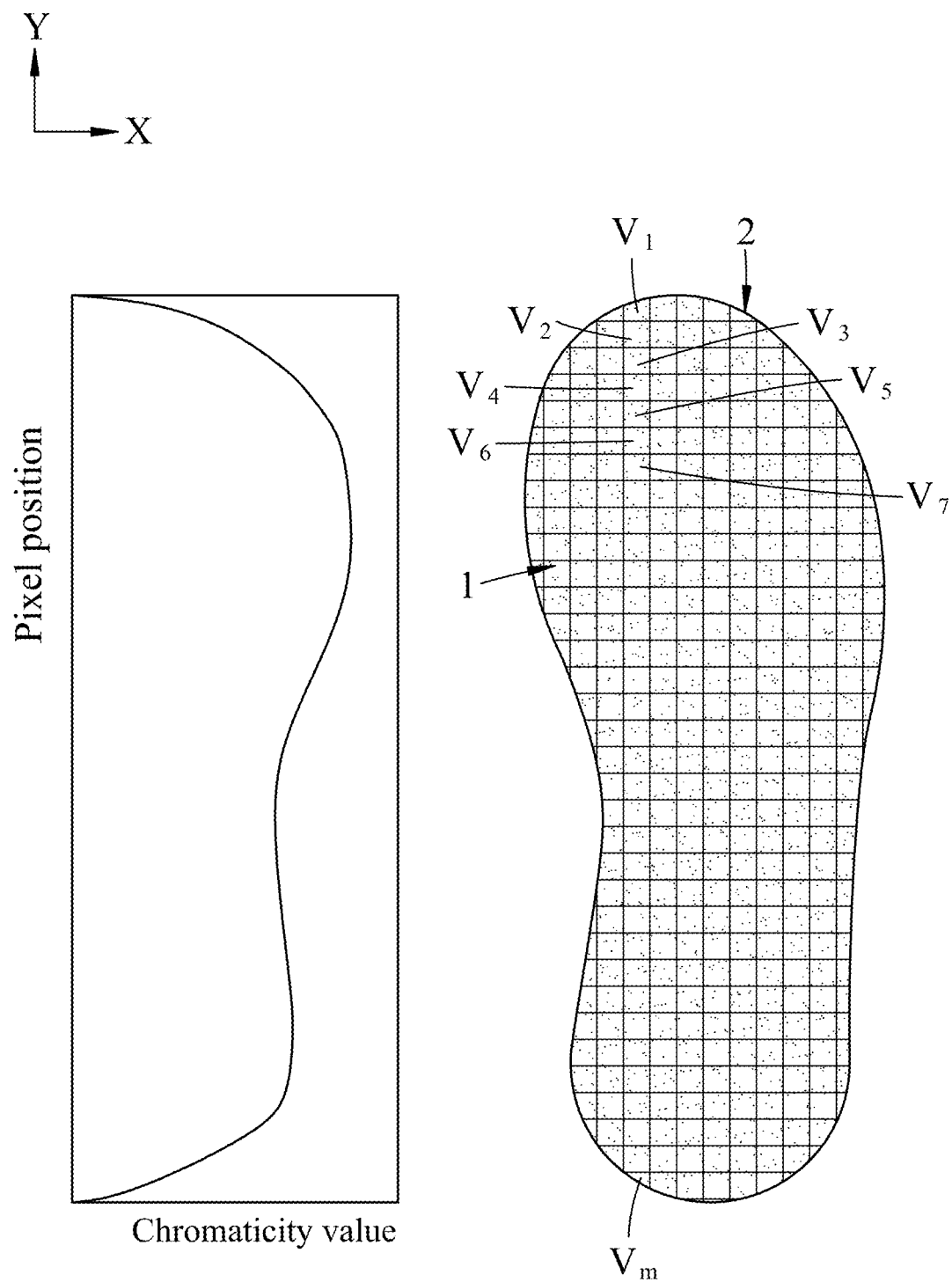
FIG. 4 is a schematic diagram illustrating an embodiment of chromaticity values of pixels selected from another instance of the image associated with the shoe portion that is applied with a desired amount of the glue.

In one embodiment, the predetermined base value is $$V_0 = \sum_{i=1}^{m} \frac{V_i - N_i}{m},$$

where $V_1$ to $V_m$ each represent a respective one of m number of predetermined standard values which are chromaticity values of m number of pixels selected from a standard image which is further another instance of the image associated with the shoe portion 2 that is applied with a desired, standard amount of the glue as shown in FIG. 4.

In one embodiment, the processor 5 is configured to calculate m number of difference values $J_i=R_i-V_0$ where i is an integer ranging from 1 to m. For one of the m number of difference values $J_i$, the processor 5 is configured to generate the result of estimation which indicates that the amount of the glue is normal when it is determined by the processor 5 that the difference value falls in another range from $-A$ to $+A$, to generate the result of estimation which indicates that the amount of the glue is abnormal and deficient when it is determined by the processor 5 that the difference value $J_i$ is smaller than $-A$, and to generate the result of estimation which indicates that the amount of the glue is abnormal and excessive when it is determined by the processor 5 that the difference value is greater than $+A$.

Each of FIGS. 5 and 6 illustrates a profile of the chromaticity values of pixels selected along a Y direction in the image of the shoe portion 2. In FIG. 5, the chromaticity values of pixels between two dashed lines are, in general, substantially greater than those outside the two dashed lines, which means that the amount of the glue applied to the parts of the shoe portion 2 corresponding to the selected pixels between the two dashed lines is greater than other parts of the shoe portion 2 corresponding to the selected pixels outside the two dashed lines. On the other hand, in FIG. 6, the chromaticity values of pixels between the two dashed lines are generally smaller than those outside of and nearby the two dashed lines, which means that the amount of the glue applied to the parts of the shoe portion 2 corresponding to the selected pixels between the two dashed lines is smaller than other parts of the shoe portion 2 corresponding to the selected pixels outside of and nearby the two dashed lines.

Figure 2:
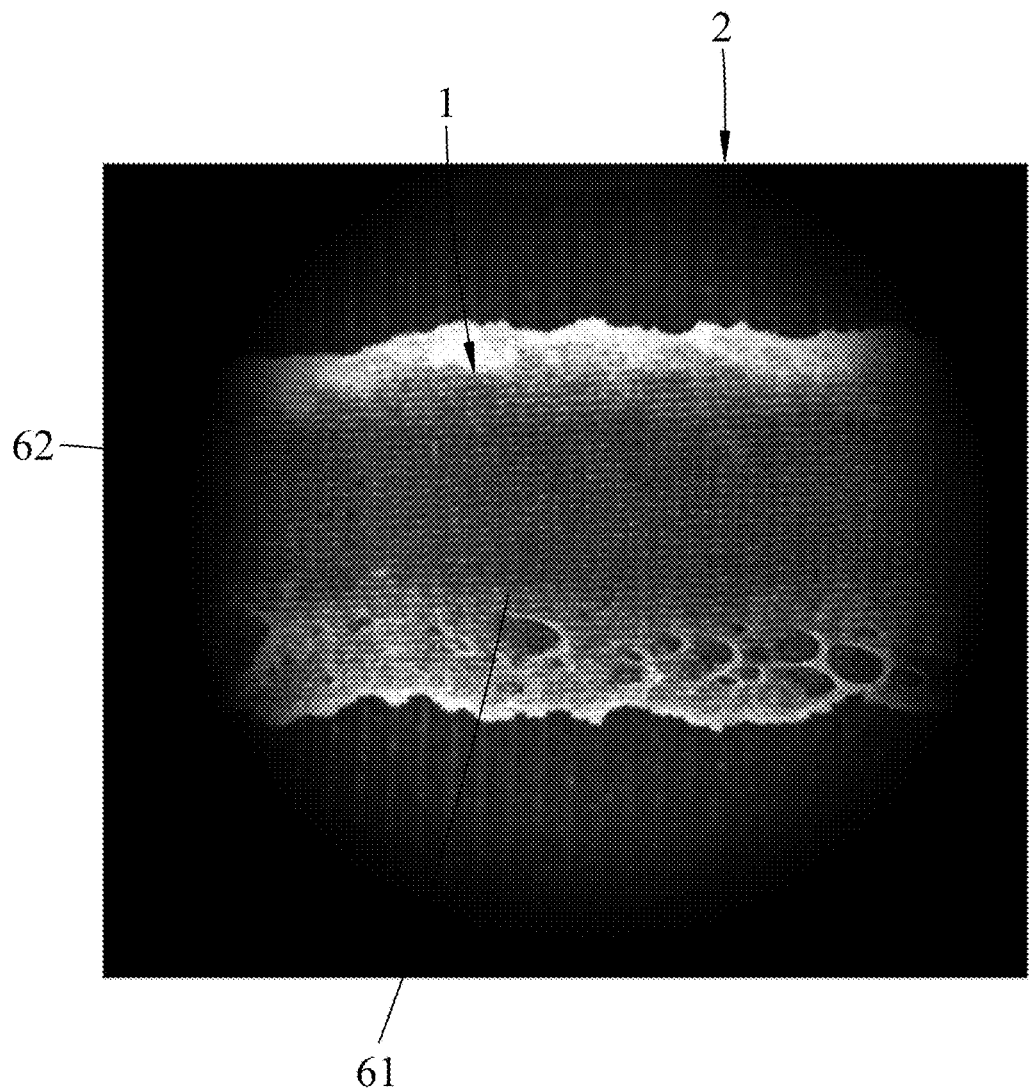
FIG. 2 is an actual image exemplifying an image that is captured by the system according to the disclosure.

In a variant embodiment of the embodiment previously disclosed, the processor 5 is configure to obtain the chromaticity values $M_1$ to $M_m$ of m number of pixels and a chromaticity value $N_k$ of at least one pixel all from a single image that is associated with the shoe portion 2 as shown in FIG. 2, and to determine the amount of the glue applied to the shoe portion 2 based on the chromaticity values thus obtained. Specifically speaking, the instance of the image is associated with the shoe portion 2 that is partially applied with the glue and that has a glue image part 61 corresponding to a part of shoe portion 2 applied with the glue, and a shoe image part 62 corresponding to a remaining part of the shoe portion 2 not applied with the glue. The m number of pixels exhibiting the chromaticity values $M_1$ to $M_m$ are selected from the glue image part 61 of the instance of the image associated with the shoe portion 2 that is partially applied with glue, and said at least one pixel exhibiting the chromaticity value $N_k$ is selected from the shoe image part 62 corresponding to the remaining part of the shoe portion 2 not applied with the glue. In this embodiment, the processor 5 is configured to obtain the chromaticity values $M_1$ to $M_m$ of m number of pixels and the chromaticity value $N_k$ of said at least one pixel along a predetermined direction of the image associated with the shoe portion 2 that is partially applied with the glue.

The processor 5 is configured to generate the result of estimation regarding the amount of the glue applied to the shoe portion 2 based on the chromaticity value $N_k$ and the chromaticity values $M_1$ to $M_m$.

The processor 5 is further configured to calculate m number of deviation values $R_i=M_i-N_k$ where i is an integer ranging from 1 to m, and for one of the m number of deviation values $R_i$, generate the result of estimation which indicates that the amount of the glue is normal when it is determined by the processor 5 that a condition that the deviation value falls in a range from $V_0-A$ to $V_0+A$ is satisfied, and generate the result of estimation which indicates that the amount of the glue is abnormal when it is determined by the processor 5 that the condition is not satisfied, where $V_0$ represents the predetermined base value, and A represents the predetermined tolerance value. In one embodiment, for one of the m number of deviation values $R_i$, the processor 5 is configured to generate the result of estimation which indicates that the amount of the glue is deficient when it is determined by the processor 5 that the deviation value is smaller than $V_0-A$, and generate the result of estimation which indicates that the amount of the glue is excessive when it is determined by the processor 5 that the deviation value is greater than $V_0+A$.

In this embodiment, since the determination of the predetermined base value and the generation of the result of estimation of the amount of the glue are similar to what are disclosed in previous embodiment, details thereof will be omitted herein for the sake of brevity.

The processor 5 is configured to calculate m number of difference values $J_i=R_i-V_0$ where i is an integer ranging from 1 to m. The processor 5 is configured to, for one of the m number of difference values $J_i$, generate the result of estimation which indicates that the amount of the glue is normal when it is determined by the processor 5 that the difference value falls in another range from $-A$ to $+A$, generate the result of estimation which indicates that the amount of the glue is deficient when it is determined by the processor 5 that the difference value is smaller than $-A$, and generate the result of estimation which indicates that the amount of the glue is excessive when it is determined by the processor 5 that the difference value is greater than A.

Next, an example of estimating the amount of the glue applied to the shoe portion 2 will be provided. Referring to Table 1, seven pixels along the Y direction of the image (as shown in FIG. 5 or 6) associated with the shoe portion 2 that is applied with the glue are selected for inspection, i.e., m=7. The processor 5 performs operations described in the following based on information provided in Table 1 so as to determine the amount of glue applied to parts of the shoe portion 2 corresponding to the pixels which are selected from the image associated with the shoe portion 2 that is applied with the glue. In this example, the chromaticity values of corresponding seven pixels selected from the reference image are all determined to be one hundred, i.e., $N_i=100$ for i being an integer ranging from 1 to 7, and the predetermined tolerance value is assumed to be five, i.e., A=5. Seven predetermined standard values $V_1$ to $V_7$, which are chromaticity values of seven pixels selected from the standard image as shown in FIG. 4, are presented in Table 1 as well.

TABLE 1

| m | $V_i$ | $V_i - N_i$ | Chromaticity values $M_i$ | Deviation value $R_i$ | Difference value $J_i$ | Range of tolerance + A to − A | Result of estimation |
|---|---|---|---|---|---|---|---|
| 1 | 111 | 11 | 121 | 21 | 7.857 | +5 to −5 | Abnormal Excessive |
| 2 | 114 | 14 | 135 | 35 | 21.857 | +5 to −5 | Abnormal Excessive |
| 3 | 112 | 12 | 119 | 19 | 5.857 | +5 to −5 | Abnormal Excessive |
| 4 | 113 | 13 | 105 | 5 | −8.143 | +5 to −5 | Abnormal Deficient |
| 5 | 114 | 14 | 100 | 0 | −13.143 | +5 to −5 | Abnormal Deficient |
| 6 | 115 | 15 | 114 | 14 | 0.857 | +5 to −5 | Normal |
| 7 | 113 | 13 | 113 | 13 | −0.143 | +5 to −5 | Normal |
|   | Base value | 13.143 |   |   |   |   |   |

The processor 5 calculates the predetermined base value to be $$V_0 = \sum_{i=1}^{m} \frac{V_i - N_i}{m} = \frac{11+14+12+13+14+15+13}{7} = 13.143.$$

In one embodiment, the processor 5 calculates the deviation values $R_i = M_i - N_i$ for i ranging from 1 to 7 as follows:

$R_1 = M_1 - N_1 = 121 - 100 = 21;$ $R_2 = M_2 - N_2 = 135 - 100 = 35;$ $R_3 = M_3 - N_3 = 119 - 100 = 19;$ $R_4 = M_4 - N_4 = 105 - 100 = 5;$ $R_5 = M_5 - N_5 = 100 - 100 = 0;$ $R_6 = M_6 - N_6 = 114 - 100 = 14;$ $R_7 = M_7 - N_7 = 113 - 100 = 13.$

Based on the deviation values previously calculated, i.e., $R_i = M_i - N_i$ for i ranging from 1 to 7, the processor 5 generates the results of estimation each of which regards the amount of glue applied to a part of the shoe portion 2 corresponding to a respective one of the pixels selected from the image.

For example, the deviation value of the first one of the pixels selected from the image is calculated as $R_1 = 21$, which is greater than the upper bound of the range from 18.143 to 8.143 (the range from $V_0 + A$ to $V_0 - A$), i.e., greater than 18.143, so the processor 5 determines that the amount of glue applied to a part of the shoe portion 2 corresponding to the first one of the pixels selected from the image is abnormal and excessive. Since determination of the amount of glue corresponding to the remaining one(s) of the pixels is made in a similar way, details thereof are omitted herein for the sake of brevity.

In one embodiment, the processor 5 calculates the difference values $J_i = R_i - V_0$ for i ranging from 1 to 7 as follows:

$J_1 = R_1 - V_0 = 21 - 13.143 = 7.857;$ $J_2 = R_2 - V_0 = 35 - 13.143 = 21.857;$ $J_3 = R_3 - V_0 = 19 - 13.143 = 5.857;$ $J_4 = R_4 - V_0 = 5 - 13.143 = -8.143;$ $J_5 = R_5 - V_0 = 0 - 13.143 = -13.143;$ $J_6 = R_6 - V_0 = 14 - 13.143 = 0.857;$ $J_7 = R_7 - V_0 = 13 - 13.143 = -0.143.$

Based on the difference values previously calculated, i.e., $J_i = R_i - V_0$ for i ranging from 1 to 7, the processor 5 generates the results of estimation each of which regards the amount of glue applied to a part of the shoe portion 2 corresponding to a respective one of the pixels selected from the image.

For example, the difference value of the first one of the pixels selected from the image is calculated as $J_1 = 7.857$, which is greater than the upper bound of said another range from −5 to +5 (said another range from −A to +A), i.e., greater than +5, so the processor 5 determines that the amount of glue applied to a part of the shoe portion 2 corresponding to the first one of the pixels selected from the image is abnormal and excessive. Since determination of the amount of glue corresponding to the remaining one(s) of the pixels is made in a similar way, details thereof will be omitted herein for the sake of brevity.

In summary, the system for determining an amount of glue applied to a shoe portion according to the disclosure utilizes the image capturing device to capture and output the image of the shoe portion, and generates a result of estimation regarding the amount of the glue applied to the shoe portion based on the chromaticity values of pixels selected from the image of the shoe portion. Pixel-based estimation enables the system of the disclosure to detect local variation in the amount of the glue applied to the shoe portion. Moreover, the system according to the disclosure realizes automatic determination of the amount of glue applied to the shoe portion based on the chromaticity values of selected pixels of the image. Consequently, efficiency of inspection in the manufacturing process of the shoe may be enhanced, and cost of production of shoes may be reduced. Furthermore, quantification of the amount of glue applied to the shoe portion can be realized based on the difference values $J_i$ of the pixels thus obtained in the disclosure so a time required for drying the glue can be further determined. For example, for a region of the shoe portion where the difference value is 0.857, representing a relatively greater amount of glue, a relatively longer time for drying, e.g., five minutes, is consequently required. For another region of the shoe portion where the difference value is −0.143, representing a relatively smaller amount of glue, a relatively shorter time for drying, e.g., three minutes, is consequently required. Therefore, the system of this disclosure enables differentiation in terms of time for drying for different amounts of glue applied to the shoe portion so as to improve effect of curing of the glue.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A system for determining an amount of glue applied to a shoe portion, said system comprising:
    a lighting device configured to illuminate the shoe portion with light beams that have wavelengths within a predetermined range;
    an image capturing device configured to capture an image associated with the shoe portion under illumination of the light beams, and to output the image associated with the shoe portion; and
    a processor configured to obtain chromaticity values $M_1$ to $M_m$ of m number of pixels selected from an instance of the image associated with the shoe portion that is applied with the glue, and to generate a result of estimation regarding the amount of the glue applied to the shoe portion based on the chromaticity values $M_1$ to $M_m$, where m is an integer not less than one;
    wherein for the instance of the image associated with the shoe portion that is fully applied with the glue, said processor is further configured to obtain chromaticity values $N_1$ to $N_m$ of m number of pixels selected from a reference image which is another instance of the image associated with the shoe portion that is not applied with the glue, the m number of pixels which are selected from the reference image respectively corresponding to the pixels which are selected from the instance of the image associated with the shoe portion that is applied with the glue, said processor generating the result of estimation regarding the amount of the glue applied to the shoe portion further based on the chromaticity values $N_1$ to $N_m$;
    wherein for the instance of the image which is associated with the shoe portion that is partially applied with the glue, and which has a glue image part corresponding to a part of shoe portion applied with the glue, and a shoe image part corresponding to a part of the shoe portion not applied with the glue, the chromaticity values $M_1$ to $M_m$ are selected from the glue image part of the instance of the image associated with the shoe portion that is partially applied with the glue, and said processor is further configured to obtain a chromaticity value $N_k$ of at least one pixel selected from the shoe image part of the instance of the image associated with the shoe portion that is partially applied with the glue, said processor generating the result of estimation regarding the amount of the glue applied to the shoe portion further based on the chromaticity value $N_k$.

2. The system as claimed in claim 1, wherein for each of pixels of the image associated with the shoe portion, the chromaticity value of the pixel is encoded using eight or more bits.

3. The system as claimed in claim 1, wherein said processor is further configured to
    calculate m number of deviation values $R_i = M_i − N_i$ where i is an integer ranging from 1 to m, and
    for one of the m number of deviation values $R_i$, generate the result of estimation which indicates that the amount of the glue is normal when it is determined by said processor that a condition that the deviation value falls in a range from $V_0 − A$ to $V_0 + A$ is satisfied, and generate the result of estimation which indicates that the amount of the glue is abnormal when it is determined by said processor that the condition is not satisfied, where $V_0$ represents a predetermined base value, and A represents a predetermined tolerance value.

4. The system as claimed in claim 3, wherein said processor is further configured to
    for one of the m number of deviation values $R_i$, generate the result of estimation which indicates that the amount of the glue is deficient when it is determined by said processor that the deviation value is smaller than $V_0 − A$, and generate the result of estimation which indicates that the amount of the glue is excessive when it is determined by said processor that the deviation value is greater than $V_0 + A$.

5. The system as claimed in claim 3, wherein the predetermined base value is $$V_0 = \sum_{i=1}^{m} \frac{V_i - N_i}{m},$$

where $V_1$ to $V_m$ each represent a respective one of m number of predetermined standard values which are chromaticity values of m number of pixels selected from a standard image which is further another instance of the image associated with the shoe portion that is applied with a standard amount of the glue.

6. The system as claimed in claim 3, wherein said processor is configured to
    calculate m number of difference values $J_i = R_i − V_0$ where i is an integer ranging from 1 to m; and
    for one of the m number of difference values $J_i$, generate the result of estimation which indicates that the amount of the glue is normal when it is determined by said processor that the difference value falls in another range from −A to +A, generate the result of estimation which indicates that the amount of the glue is deficient when it is determined by said processor that the difference value is smaller than −A, and generate the result of estimation which indicates that the amount of the glue is excessive when it is determined by said processor that the difference value is greater than A.

7. The system as claimed in claim 1, wherein said processor is configured to obtain the chromaticity values $M_1$ to $M_m$ of m number of pixels along a predetermined direction of the image associated with the shoe portion.

* * * * *